United States Patent [19]

Eck et al.

[11] Patent Number: 4,704,416

[45] Date of Patent: Nov. 3, 1987

[54] AQUEOUS REDISPERSIBLE POWDERS WHICH CONTAIN A WATER-SOLUBLE POLYMER AND AT LEAST ONE ORGANIC SILICON COMPOUND AND A PROCESS FOR PREPARING THE SAME

[75] Inventors: Herbert Eck; Michael Roth, both of Burghausen, Fed. Rep. of Germany

[73] Assignee: Wacker-Chemie GmbH, Munich, Fed. Rep. of Germany

[21] Appl. No.: 916,763

[22] Filed: Oct. 8, 1986

[30] Foreign Application Priority Data

Dec. 19, 1985 [DE] Fed. Rep. of Germany ....... 3545030

[51] Int. Cl.$^4$ ............................................. C08L 89/00
[52] U.S. Cl. ................................. 524/17; 106/287.12; 106/287.13; 106/287.14; 106/287.16; 524/22; 524/25; 524/43; 524/45; 524/46; 524/47; 524/48; 524/50; 524/51; 524/445; 524/446; 525/100; 525/101; 525/103
[58] Field of Search ............... 524/17, 22, 25, 43, 524/45, 46, 47, 48, 50, 51, 445, 446; 525/100, 101, 103; 106/287.12, 287.13, 287.14, 287.16

[56] References Cited

U.S. PATENT DOCUMENTS 3,959,102 5/1976 Wajs et al. ...................... 525/103
4,281,233 7/1981 Coupek et al. .................. 524/25
4,446,259 5/1984 Vasta ................................ 525/103

*Primary Examiner*—Melvyn I. Marquis

[57] ABSTRACT

Aqueous redispersible powders which contain a water-soluble polymer and at least one organic silicon compound, in which at least 50 percent by weight of the organic silicon compound(s) used to prepare these powders are liquid or solid at room temperature at 1,020 hPa (abs.), have a boiling point of at least 150° C. at 1,020 hPa (abs.), and contain an average of not more than 1.8 SiC-bonded organic radicals per silicon atom, and have at least one hydrogen atom bonded directly to silicon per molecule, or at least one hydroxy group bonded to silicon per molecule, or at least one hydrocarbon radical bonded to silicon via oxygen per molecule which may be substituted by an alkoxy group, or a mixture of at least two such condensable substituents in which the organic silicon compound(s) are used in an amount of at least 30 percent by weight, based on the total weight of the powder (calculated as anhydrous powder). These powders are obtained by spray-drying aqueous mixtures of the water-soluble polymers and the organic silicon compound and may be used, for example, as hydraulic binders, as clay and coloring materials, for rendering bulk materials hydrophobic when diluted with water, and as binders for finely-divided inorganic or organic materials.

8 Claims, No Drawings

AQUEOUS REDISPERSIBLE POWDERS WHICH CONTAIN A WATER-SOLUBLE POLYMER AND AT LEAST ONE ORGANIC SILICON COMPOUND AND A PROCESS FOR PREPARING THE SAME

The present invention relates to redispersible powders and particularly to aqueous redispersible powders which contain a water-soluble polymer and at least one organic silicon compound. More particularly, the invention relates to a process for preparing aqueous redispersible powders which contain a water-soluble polymer and at least one organic silicon compound.

BACKGROUND OF THE INVENTION

Sometimes, it may, for example, be desirable to be able to mix hydraulic binders, while still in the dry state, with organic silicon compounds, even before the binders have been delivered to the consumer without the consumer having difficulties when the binders are further processed because of the presence of the organic silicon compounds. For this reason, it is desirable to provide powders which are redispersible in water and contain at least 30 percent by weight, based on the weight of the powders, of at least one organic silicon compound, in which at least 50 percent by weight of the organic silicon compound(s) used in preparing these powders are liquid or solid at room temperature at 1,020 hPa (abs.) and also contain hydrogen which is bonded directly to a silicon atom and/or condensable groups.

Powders that are redispersible in water and contain a water-soluble polymer and organic silicon compounds are described in U.S. Pat. No. 3,210,208 to Grass et al. This reference does not, however, disclose organic silicon compounds containing condensable atoms or groups.

Mixtures containing a water-soluble polymer and an organic silicon compound containing condensable groups are described in EP-PS No. 53 223 (published on 9th June, 1982, M. Roth et al, Wacker-Chemie GmbH). However, this reference does not disclose a process where the powder may be recovered by spraying-drying.

Even though these references disclose powders containing a water-soluble polymer and an organic silicon compound, it is unexpected and unobvious that aqueous emulsions or suspensions of compounds containing condensable and/or hydrolyzable substituents could be spray-dried at relatively high temperatures to provide usable products.

It is, therefore an object of the present invention to provide powders which are readily dispersible in water. Another object of the present invention is to provide powders which are redispersible in water which contain a water-soluble polymer and at least one organic silicon compound. Another object of the present invention is to provide a process for preparing powders which can be redispersed in water. Still another object of the present invention is to provide a process for preparing usable powders from an aqueous emulsion or suspension of compounds containing condensable and/or hydrolyzable substituents. A further object of the present invention is to provide a process for preparing aqueous redispersible powders which contain a water-soluble polymer and at least one organic silicon compound.

SUMMARY OF THE INVENTION

The foregoing objects and others which will become apparent from the following description are accomplished in accordance with this invention, generally speaking, by providing powders which are redispersible in water and contain a water-soluble polymer and at least one organic silicon compound, in which at least 50 percent by weight of the organic silicon compound(s) used in the preparation of these powders are liquid or solid at room temperature at 1,020 hPa (abs.), have a boiling point of at least 150° C. at 1,020 hPa (abs.), and contain an average of not more than 1.8 SiC-bonded organic radicals per silicon atom, and have at least one hydrogen atom bonded directly to silicon per molecule, or at least one hydroxy group bonded directly to silicon per molecule, or at least one hydrocarbon radical bonded to silicon via oxygen per molecule, which may be substituted by an alkoxy group or a mixture of at least two such condensable substituents.

The invention also relates to a process for preparing the redispersible powders which comprises spray-drying aqueous emulsions or suspensions containing organic silicon compound(s) and a water-soluble polymer, in which at least 50 percent by weight of the organic silicon compound(s) contain an organic silicon compound that is liquid or solid at room temperature at 1020 hPa (abs.), has a boiling point of at least 150° C. at 1,020 hPa (abs.), and has an average of not more than 1.8 SiC-bonded organic radicals per silicon atom, and has at least one hydrogen atom bonded directly to silicon per molecule, or at least one hydroxy group bonded directly to silicon per molecule, or at least one hydrocarbon radical bonded to silicon via oxygen per molecule, which may be substituted by an alkoxy group, or a mixture of at least two such condensable substituents, in which the amount of organic silicon compound dispersed in water is at least 30 percent by weight, based on the total weight of the substances dispersed in water, which have a boiling point of at least 150° C. at 1,020 hPa (abs.).

DESCRIPTION OF THE INVENTION

The redispersible powders of this invention are obtained by spray-drying aqueous mixtures of a water-soluble polymer and at least one organic silicon compound which is a liquid or solid at room temperature at 1,020 hPa (abs.) and has a boiling point of at least 150° C. at 1,020 hPa (abs.) and has an average of not more than 1.8 SiC-bonded organic radicals per silicon atom.

Examples of preferred water-soluble polymers are polyvinyl alcohols which have been obtained from the hydrolysis of polyvinyl acetate and have a degree of hydrolysis of from 70 to 99.5 mole percent, preferably from 80 to 99 mole percent, and more preferably from 80 to 90 mole percent, and a molecular weight of from 15,000 to 100,000, as determined by a viscosimeter. Other examples of water-soluble polymers which may be used in preparing the powders according to this invention are vinyl-pyrrolidone polymers, especially polyvinylpyrrolidones having a molecular weight of from 5,000 to 400,000, starches and starch derivatives, such as hydroxy-alkylated starches, phosphated starches, sulphated starches that are both phosphated and sulphated, carboxymethyl starches, degraded starches, for example dextrins, water-soluble polyacrylates, water-soluble polymethacrylates, water-soluble poly(meth)acrylamides, polymaleates, polyvinyl sulphonates, water-soluble cellulose ethers, such as carboxymethylcellulose, hydroxyalkylcelluloses, methylcellulose, cellulose mixed ethers and also water-soluble proteins, such as casein, soya proteins and gelatin.

The powders of this invention may contain one or more different types of water-soluble polymers. Likewise, in the process of preparing the powders of this invention, one type of water-soluble polymer or a mixture of at least two different types of water-soluble polymers may be employed.

The water-soluble polymer is generally used in an amount of from 3 to 60 percent by weight, preferably in an amount of from 5 to 50 percent by weight, and more preferably from 5 to 15 percent by weight, based on the weight of the organosilicon compound used in the preparation of the powder.

The organic silicon compounds used in the preparation of the powders of this invention may, for example, have the formula $$R_a Si(OR^1)_{4-a}$$

where R represents a monovalent hydrocarbon radical which may contain at least one substituent that is inert towards water at the particular drying temperature, $R^1$ represents the same or different alkyl or alkoxy-alkylene radicals each having from 1 to 4 carbon atoms per radical, and a represents 0 or 1, with the proviso that silanes of this type must have a boiling point of at least 150° C. at 1,020 hPa (abs.). These silanes may be in admixture with silanes having the formula $$R_b Si(OR^1)_{4-b}$$

where R and $R^1$ are the same as above and b represents 2 or 3, with the proviso that the average value of a and b is not more than 1.8 and the boiling point of such mixtures is at least 150° C. at 1,020 hPa (abs.).

The organic silicon compounds used in preparing the powders of this invention may, for example, be partial hydrolyzates of the above-mentioned silianes or silane mixtures or organo(poly)siloxanes having units of the formula $$R_c H_d Si(OR^1)_e (OH)_f O_{(4-c-d-e-f)/2}$$

in which R and $R^1$ are the same as above, c represents 0, 1, 2 or 3, with an average of from 0 to 1.8, d represents 0 or 1, with an average of from 0 to 1, e represents, 0, 1, 2 or 3, with an average of from 0.01 to 2.0, and f represents 0, 1, 2 or 3, with an average of from 0 to 0.5, with the proviso that the sum of c+d+e+f is not more than 3.5 per unit.

The organic silicon compounds used in preparing the powders of this invention may, for example, be trimethylsiloxy-terminated methyl hydrogen polysiloxanes or trimethylsiloxy-terminated copolymers of dimethylsiloxane and methyl hydrogen siloxane units.

The organic radicals represented by R preferably have up to and including 18 carbon atoms per radical. Examples of hydrocarbon radicals represented by R are alkyl radicals, such as the methyl, ethyl, n-propyl, isopropyl and 2-ethylhexyl radicals, and also hexyl and octadecyl radicals; hydrocarbon radicals having at least one aliphatic carbon-carbon double bond, such as the vinyl, allyl, ethylallyl and butadienyl radicals; cycloalkyl radicals, such as the cyclohexyl radical; aryl radicals, such as the phenyl radical; alkaryl radicals, such as the tolyl radicals; and aralkyl radicals, such as the benzyl radical.

Examples of substituted hydrocarbon radicals represented by R are halogenated hydrocarbon radicals, such as the 3,3,3-trifluoropropyl radical and the 3-chloropropyl radical and also chlorophenyl radicals; mercaptoalkyl radicals, such as the 3-mercaptopropyl radical; and acyloxyalkyl radicals, such as the 3-methacryloxypropyl radical.

Examples of alkyl radicals represented by $R^1$ are the methyl, ethyl, n-propyl, isopropyl, n-butyl, sec-butyl and tert-butyl radicals. A preferred example of an alkoxyalkylene radical is the methoxyethylene radical.

Specific examples of organic silicon compounds which may be used in preparing the powders of this invention are 3-mercaptopropyltrimethoxysilane, vinyltris-(methoxyethyleneoxy)-silane, 3-methacrylpropyltris-(methoxyethyleneoxy)silane, n-octyltriethoxysilane, 2-ethylhexyltrimethoxysilane, polyethyl silicates, organopolysiloxanes having an empirical formula of $$CH_3Si(OC_2H_5)_{0.8}O_{1.1},$$

with an average molecular weight of approximately 600 g/mol and a viscosity of approximately 20 mm$^2 \cdot $s$^{-1}$ at 25° C., an organopolysiloxane having an empirical formula of $$CH_3Si(OCH_3)_{0.8}O_{1.1},$$

with an average molecular weight of approximately 650 g/mol and a viscosity of approximately 30 mm$^2 \cdot $s$^{-1}$ at 25° C., an organopolysiloxane having an empirical formula of $$C_6H_5Si(OC_2H_5)_{0.72}O_{1.14},$$

with an average molecular weight of approximately 3,000 g/mol and a viscosity of approximately 25,000 mm$^2 \cdot $s$^{-1}$ at 25° C., an organosiloxane of the formula $$R^2Si(OCH_3)_2O_{0.5}$$

in which 70 percent of the $R^2$ radicals are methyl groups and 30 percent of the $R^2$ radicals are 2-ethylhexyl groups, and a trimethylsiloxy-terminated methyl hydrogen polysiloxane having a viscosity of approximately 20 mm$^2 \cdot $s$^{-1}$ at 25° C.

The powders of this invention may contain one or more different types of organic silicon compounds. Likewise, in the process of this invention, one type of organic silicon compound or a mixture of at least two different types of organic silicon compounds may be employed.

When it is desirable to impart hydrophobic properties to the powders of this invention, then at least some of the organic silicon compounds must contain an average of at least 0.8 SiC-bonded, hydrocarbon or halogenated hydrocarbon radicals per silicon atom.

In preparing the powders of this invention, it is preferred that a total of from 40 to 97 percent by weight, and more preferably from 70 to 95 percent by weight, based on the total weight of the powder (calculated as anhydrous powder), of an organic silicon compound be used.

In addition to the organic silicon compound and the water-soluble polymer, the powders of this invention may also contain additional substances, which may optionally be sprayed concomitantly in the process of this invention, but only in amounts which ensure that the finished powders still contain a total of at least 30 percent by weight of organic silicon compound, based on the total weight of the particular powder (calculated as anhydrous powder). Examples of such additional substances which may be employed are water-miscible solvents, such as diacetone alcohol, water-immiscible solvents, such as mixtures of xylene isomers, ionogenic or non-ionogenic emulsifiers other than water-soluble polymers, such as sodium lauryl sulphate, fungicides, anti-foam agents, soluble dyestuffs, pigments, fillers having a surface area of at least 50 m$^2$/g, such as pyrogenically produced silicon dioxide, and fillers having a surface area of less than 50 m$^2$/g, such as chalk powder, needle-shaped calcium carbonate and quartz powder.

The amount of water present in the mixtures to be spray-dried is preferably from 45 to 95 percent by weight, and more preferably from about 60 to 85 percent by weight, based on the total weight of the particular mixture to be sprayed.

Spray-drying can be carried out in any apparatus which is suitable for spray-drying liquids and which are already well known, such as, for example those having at least one spinning spray nozzle or having a rotating spray disc, in a preferably heated dry gas stream.

The inlet temperature of the dry gas stream, which is usually air, is preferably from 80° to 250° C., especially from 110° to 190° C., and the outlet temperature of the gas stream formed on drying is from 40° to 100° C., and more preferably from 50° to 90° C.

Anti-caking agents may be introduced into the apparatus separately from the feed mixture in which the spray-drying takes place, but, of course, again only in amounts which ensure that the finished powders will contain a total of at least 30 percent by weight of organic silicon compound, based on the total weight of the particular powder (calculated as anhydrous powder). The amount of anti-caking agent may preferably range from about 1 to 20 percent by weight, based on the total weight of the particular organic silicon compound used, if the anti-caking agent is used concomitantly. The anti-caking agents are generally inorganic, solid substances having an average particle size of from 0.01 to 50 micrometers. These may be, for example, aluminum silicates, colloidal silicon dioxide gel, pyrogenically produced silicon dioxide, pulverized clays, gypsum, talc, cements, chalk powders or diatomaceous earth.

The powders of this invention may be mixed, in the dry state or diluted with water with, for example, hydraulic binders, such as cement or lime and other additives to form bricks or building components, such as concrete, including aerated concrete or foamed concrete or sand-lime bricks, and also with clay fillers, such as silicon dioxide or kaolin, or coloring materials, such as pigments. When diluted with water, they may be used to impart hydrophobic properties to bulk materials, such as perlites (expanded lava), vermiculites (expanded mica), aerated concrete granules and wood shavings or sawdust. The powders of this invention may be diluted with water and used as binders for finely-divided inorganic materials, such as sand, or organic materials, such as sawdust. Furthermore, the powders of this invention or those prepared in accordance with this invention may be used, for example, as additives for adhesives or for preventing or controlling foam in an aqueous media.

In the following examples, all percentages and parts are by weight unless otherwise specified.

EXAMPLE 1

A water-in-oil emulsion is prepared from 250 g of a commercially available organopolysiloxane having the formula

$$CH_3Si(OC_2H_5)_{0.8}O_{1.1},$$

in which the average molecular weight is approximately 600 and the viscosity is approximately 20 mm$^2 \cdot$s$^{-1}$ at 25° C., and 200 g of a 10 percent aqueous solution of a polyvinyl alcohol having a degree of hydrolysis of about 87.5 mole percent and a molecular weight of about 25,000 and a 4 percent aqueous solution of the polyvinyl alcohol having a viscosity of 5 mPa.s at 20° C. This emulsion is converted into a pasty oil-in-water emulsion by the addition of 100 g of water, and then an additional 250 g of the organopolysiloxane described above is kneaded in the emulsion. The resultant mixture is first mixed with 296 g of water and then with 4 g of acetic acid, and then introduced into a spray drier which operates with a spinning spray nozzle (Nubilosa AJM 014, where the name "Nubilosa" is probably a Registered Trademark) at a nozzle pressure of 4,000 hPa (abs.), a throughput of 2 liters/hour, an air inlet temperature of 150° C. and a gas outlet temperature of 65° C., where it is converted into a readily pourable powder that is redispersible in water and has a residual moisture content of 2.6 percent.

EXAMPLE 2

About 250 g of the organopolysiloxane described in Example 1 are mixed with 496 g of the 10 percent aqueous solution of the polyvinyl alcohol described in Example 1. The resulting mixture is mixed with an additional 250 g of the organopolysiloxane described in Example 1. The mixture thus obtained is diluted with sufficient water for the efflux time to be 30 seconds in a DIN [Deutsche Industrie-Norm (German Industrial Standards)] beaker 4 and is then spray-dried in accordance with the procedure described in Example 1, except that the air inlet temperature is 175° C. and the gas outlet temperature is 85° C. A readily pourable powder is obtained which is redispersible in water and has a residual moisture content of 2.1 percent.

EXAMPLE 3

The method described in Example 2 is repeated, except that the nozzle pressure in the spray-drier is 5,400 hPa (abs.) and the air inlet temperature is 165° C. A readily pourable powder is obtained which is redispersible in water and has a residual moisture content of 1.3 percent.

EXAMPLE 4

About 250 g of the organopolysiloxane described in detail in Example 1 are mixed with 765 g of a 16.25 percent aqueous solution of a polyvinyl alcohol having a degree of hydrolysis of 81 mole percent and a molecular weight of 26,000, and a 4 percent aqueous solution of the polyvinyl alcohol having a viscosity of 5 mPa.s at 20° C. The mixture thus obtained is mixed with an additional 250 g of the organo-polysiloxane described in Example 1. The resultant mixture is mixed with 250 g of water. Its efflux time is 15 seconds in a DIN beaker 4. The emulsion is then converted, in accordance with the procedure described in Example 3, into a readily pourable powder that is redispersible in water and has a residual moisture content of 1.7 percent.

EXAMPLE 5

The method described in Example 4 is repeated, except that the concentration of the polyvinyl alcohol solution is 13.66 percent instead of 16.25 percent. A readily pourable powder is obtained which is redispersible in water and has a residual moisture content of 1.8 percent.

A mixture containing the following pulverulent constituents:
 45 parts of dolomite
 15 parts of titanium dioxide,
 32 parts of barite,
 4 parts of red iron dioxide,
 4 parts of yellow iron oxide,
are first mixed with 1 percent, based on their weight, of the redispersible powder and then with 125 percent, based on their weight, of a 25 percent aqueous solution of potassium silicate (molar ratio $SiO_2:K_2O=3.8$). Artificially manufactured sand-lime bricks are coated on all sides with the resultant silicate paint, allowed to dry for 8 days at room temperature, and then weighed. They are then placed under water at a temperature of 20° C., the water surface being 5 cm above the side nearest the surface. After various lengths of time, the bricks are removed from the water and weighed again after any loosely adhering drops of water have been removed.

The results of this test are shown in Table I. The "S-value" is the sum of the water absorption values for each row of the table. The lower the S-value, the slower the rate of water absorption.

TABLE I

| Powder prepared according to Example | Water absorption in kg/m² | | | | | | | S-Value |
|---|---|---|---|---|---|---|---|---|
| | Hours | | | | | | | |
| | 0.5 | 1 | 2 | 3 | 5 | 7 | 24 | |
| 2 | 0.12 | 0.20 | 0.33 | 0.45 | 0.70 | 0.93 | 2.66 | 5.39 |
| 3 | 0.14 | 0.25 | 0.42 | 0.60 | 0.91 | 2.10 | 3.56 | 7.08 |
| 4 | 0.13 | 0.18 | 0.31 | 0.42 | 0.60 | 0.82 | 2.34 | 4.79 |
| 5 | 0.11 | 0.14 | 0.19 | 0.23 | 0.36 | 0.45 | 1.23 | 2.70 |
| No powder | 1.45 | 2.13 | 3.06 | 3.90 | 5.45 | 6.67 | 11.47 | 34.12 |
| Untreated bricks | 4.03 | 5.36 | 7.06 | 8.47 | 10.54 | 11.20 | 11.20 | 58.06 |

EXAMPLES 6 TO 16

The substances listed in Table II are mixed with sufficient water to provide mixtures having an efflux time of from 13 to 15 seconds in a DIN beaker 4. The pH of the resultant mixtures is adjusted to 7.0 with $NaHCO_3$ and then spray-dried in spray-dryer of the type described in Example 1, with an air inlet temperature of 165° C. and a gas outlet temperature of 85° C. and at the nozzle pressures shown in Table II. In each case, readily pourable powders are obtained which are redispersible in water.

TABLE II

| Example | Silicon Compound | Water-soluble Polymer | | | | (2) % | Nozz. Pressu. hPa (abs.) |
|---|---|---|---|---|---|---|---|
| | | Type | Amount (1) Percent by Weight | Degree of Hydrolysis mol % | Molecular Weight g/mol | | |
| 6 | Same as in Example 1 | Polyvinyl Alcohol | 5 | 81 | 26,000 | 13 | 5200 |
| 7 | Same as in Example 1 | Polyvinyl Alcohol | 10 | 79 | 28,000 | 10 | 5200 |
| 8 | Organopolysiloxane of the formula (3) $CH_3Si(OCH_3)_{0.8}O_{1.1}$ | Polyvinyl Alcohol | 10 | 81 | 26,000 | 10 | 5200 |
| 9 | Same as in Example 8 | Polyvinyl Alcohol | 10 | 79 | 28,000 | 10 | 5200 |
| 10 | Trimethylsiloxy-terminated methyl hydrogen polysiloxane having a viscosity of 20 $mm^2 \cdot s^{-1}$ at 25° C. | Polyvinyl Alcohol | 10 | 81 | 26,000 | 10 | 5200 |
| 11 | 3-Mercaptopropyltrimethoxysilane | Polyvinyl Alcohol | 10 | 81 | 26,000 | 10 | 5200 |
| 12 | Silane of the formula $CH_2=CHSi[OCH(CH_3)-CH_2OCH_3]_3$ | Polyvinyl Alcohol | 10 | 79 | 26,000 | 20 | 1600 |
| 13 | gamma-methacryloxy-propyltris-(ethoxy-ethyleneoxy)silane | Polyvinyl Alcohol | 20 | 81 | 26,000 | 10 | 2000 |
| 14 | Same as in Example 13 | Polyvinyl Alcohol | 20 | 87.5 | 25,000 | 20 | 5200 |
| 15 | Same as in Example 1 | Polyvinyl Alcohol | 10 | 79 | 28,000 | 10 | 5200 |
| 16 | n-Octyltrimethoxysilane | (4) | 35 | — | — | 35 | 5200 |

+0.5% by weight of a sodium sulphonate of aliphatic alcohols having approximately 13 carbon atoms (1) Calculated on the total weight of water-soluble polymer and silicon compound.
(2) Percent by weight of polymer, calculated on the total weight of the aqueous solution of the water-soluble polymer used.
(3) Commercially available organopolysiloxane having an average molecular weight of approximately 650 g/mol and a viscosity of about 30 $mm^2 \cdot s^{-1}$ at 25° C.
(4) "Yellow dextrin D 3100, thin-boiling" a potato starch product, obtained from Avebe-Amylum Deutschland GmbH, 4000 Düsseldorf 1, Federal Republic of Germany. The 0.5 percent by weight is calculated on the total weight of the water-soluble polymer and silicon compound.

What is claimed is:

1. Aqueous redispersible powders which are obtained by spray-drying an aqueous mixture containing a water-soluble polymer and at least one organic silicon compound, in which at least 50 percent by weight of the organic silicon compound is liquid or solid at room temperature at 1,020 hPa (abs.), has a boiling point of at least 150° C. at 1,020 hPa (abs.), and contains an average of up to about 1.8 SiC-bonded organic radicals per silicon atom, and at least one group per molecule selected from the class consisting of a silicon-bonded hydrogen, a silicon-bonded hydroxyl group, a hydrocarbon radical bonded to silicon via oxygen, which may be substituted by an alkoxy group, and mixtures thereof, in which the organic silicon compound is present in an amount of at least 30 percent by weight, based on the total weight of the powder (calculated as anhydrous powder).

2. A process for preparing aqueous redispersible powders which contain a water-soluble polymer and at least one organic silicon compound which comprises spray-drying an aqueous emulsion or suspension containing the water-soluble polymer and the organic silicon compound, in which at least 50 percent by weight of the organic silicon compound is liquid or solid at room temperature at 1,020 hPa (abs.), and has a boiling point of at least 150° C. at 1,020 hPa (abs.), and contains an average of up to 1.8 SiC-bonded organic radicals per silicon atom and at least one group per molecule selected from the class consisting of a silicon-bonded hydrogen, a silicon-bonded hydroxyl group, a hydrocarbon radical bonded to silicon via oxygen which may be substituted by an alkoxy group, and mixtures thereof in which the amount of organic silicon compound dispersed in water is at least 30 percent by weight, based on the total weight of the substances dispersed in water which have a boiling point of at least 150° C. at 1,020 hPa (abs.).

3. A hydraulic binder containing the powders of claim 1.

4. A clay composition containing the powders of claim 1.

5. A pigment composition containing the powders of claim 1.

6. An aqueous hydrophobic composition containing the powders of claim 1.

7. A composition containing the powders of claim 1, finely-divided organic materials and water.

8. A composition containing the powders of claim 1, finely-divided inorganic materials and water.

* * * * *